Feb. 26, 1963  S. M. FREY  3,078,945
VEHICULAR MOVABLE STEERING COLUMN
Filed May 27, 1960  5 Sheets-Sheet 1

STUART M. FREY
*INVENTOR.*

BY John R. Faulkner
John J. Roethel

ATTORNEYS

Feb. 26, 1963  S. M. FREY  3,078,945
VEHICULAR MOVABLE STEERING COLUMN
Filed May 27, 1960  5 Sheets-Sheet 2
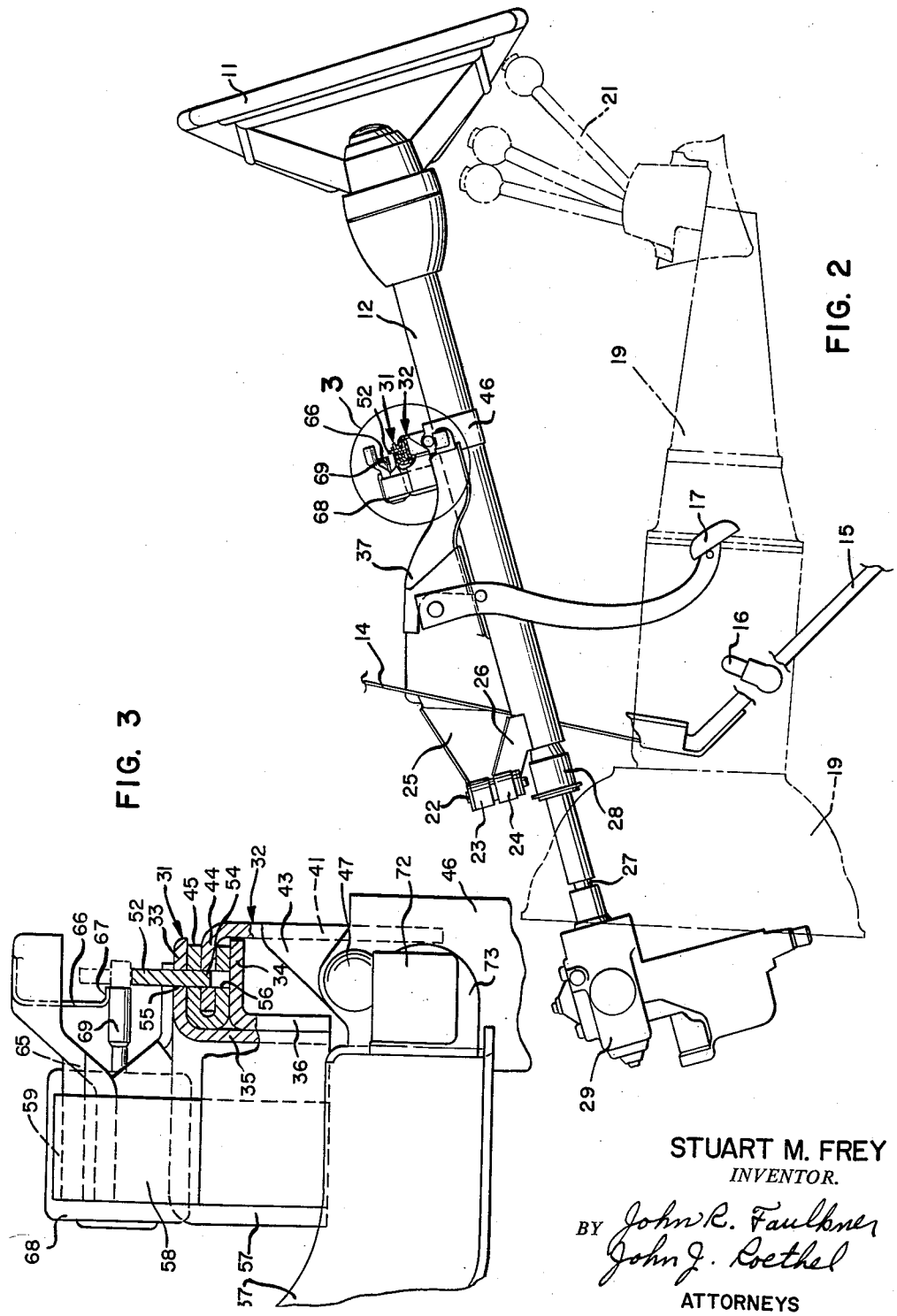
STUART M. FREY
*INVENTOR.*
BY John R. Faulkner
John J. Roethel
ATTORNEYS

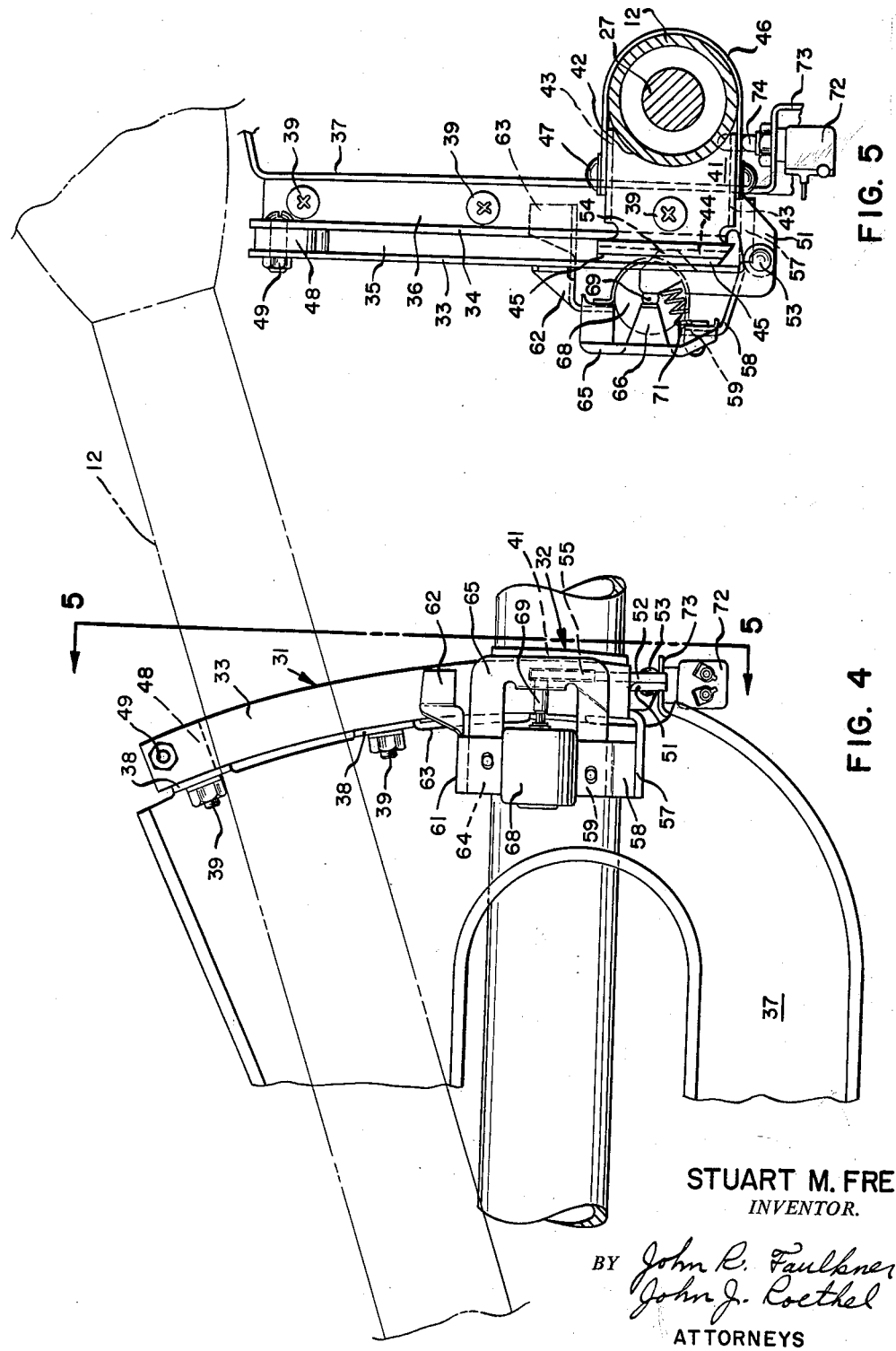

Feb. 26, 1963

S. M. FREY 3,078,945

VEHICULAR MOVABLE STEERING COLUMN

Filed May 27, 1960

STUART M. FREY
*INVENTOR.*

BY *John L. Faulkner*
*John J. Roethel*
ATTORNEYS

Feb. 26, 1963 S. M. FREY 3,078,945
VEHICULAR MOVABLE STEERING COLUMN
Filed May 27, 1960 5 Sheets-Sheet 5

STUART M. FREY
*INVENTOR.*

BY *John R. Faulkner*
*John J. Roethel*
ATTORNEYS

United States Patent Office 3,078,945
Patented Feb. 26, 1963

3,078,945
VEHICULAR MOVABLE STEERING COLUMN
Stuart M. Frey, Detroit, Mich., assignor to Ford Motor Company, Dearborn, Mich., a corporation of Delaware
Filed May 27, 1960, Ser. No. 32,221
14 Claims. (Cl. 180—82)

This invention relates generally to motor vehicle steering mechanism in which the steering wheel is supported on a movable steering column.

U.S. Patent No. 743,013, issued in November 1903, listed several advantages to be derived from a movable steering column which could be swung about to various positions. Such an arrangement was said to enable "the steersman to enter and leave his seat conveniently and also to afford an opportunity for a person seated at one side of the steersman's seat or even standing out in the road, as is sometimes done in climbing a steep hill to decrease weight, to steer the vehicle." Although it is now generally illegal for anyone other than the person seated in the "steersman seat" to steer the vehicle and it is seldom necessary for the passengers of the vehicle to disembark in order for the vehicle to travel up a steep hill, the modern motor vehicle often leaves much to be desired with regard to the ease and convenience with which the driver may take or leave his position behind the steering wheel. In many modern vehicles, particularly in the so-called sports-car type, the steering wheel column extends substantially parallel to the horizontal plane of the vehicle. Also the trend in seating is toward softer and deeper seats, particularly toward the so-called bucket seat. As a result, a certain degree of contortionistic effort is often-times required for the driver to get into and out of the driver's seat beneath the low overhang of the steering wheel.

It is an object of the present invention to provide an improved mechanical structure for supporting the steering wheel column so that the steering wheel may be swung from its normal operative position into a displaced position, thus providing easier ingress and egress to the driver's seat of the vehicle. It is another object to provide the necessary safety devices for locking the steering column in its normal operative position and for preventing operation of the vehicle when the steering column is unlocked and shifted to a displaced position.

Other objects, advantages and features of construction embodying the present invention will be made more apparent as the description proceeds, particularly when considered in connection with the accompanying drawings, wherein:

FIG. 2 is a side elevational view in part sectional of the steering column embodying the present invention;

FIG. 3 is an enlarged view of the portion of FIG. 2 within the circle 3;

FIG. 4 is a plan view of FIG. 3;

FIG. 5 is a sectional view taken substantially through the line 5—5 of FIG. 4 looking in the direction of the arrows;

Figure 7:
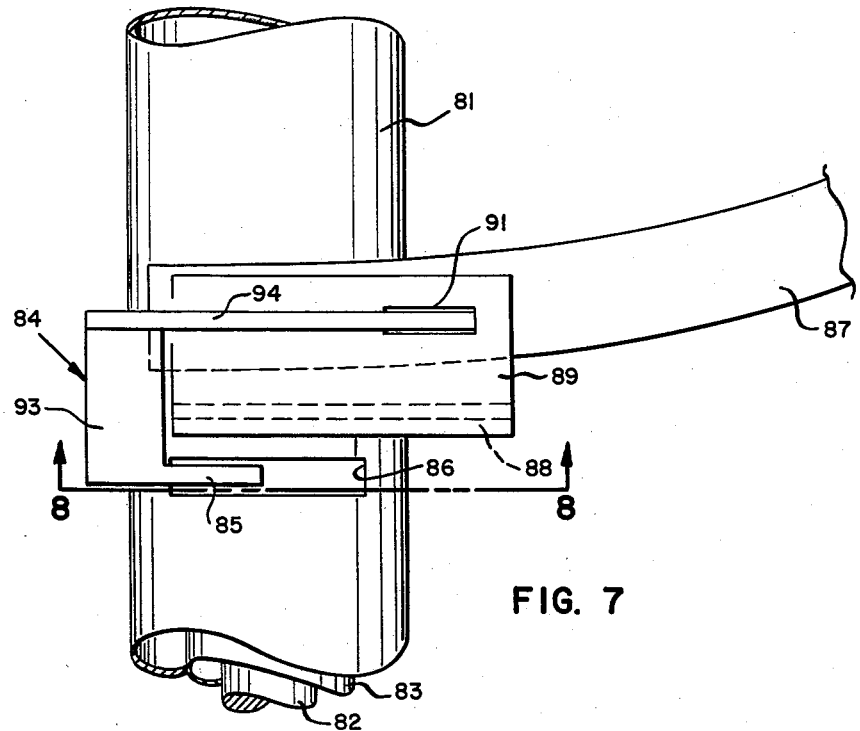
Figure 8:
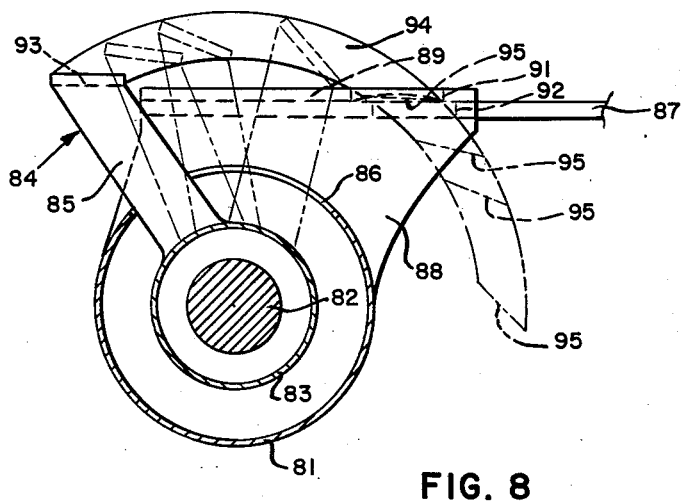

FIG. 7 is a view in part similar to FIG. 4 illustrating a second embodiment of the present invention and more particularly the use of a mechanical interlock between the vehicle transmission control and the steering column supporting assembly, the mechanical interlock being effective to prevent operation of the transmission selector lever when the steering wheel is displaced from its normal operating position; and FIG. 8 is a view taken substantially through the line 8—8 of FIG. 7 looking in the direction of the arrows.

Figure 1:
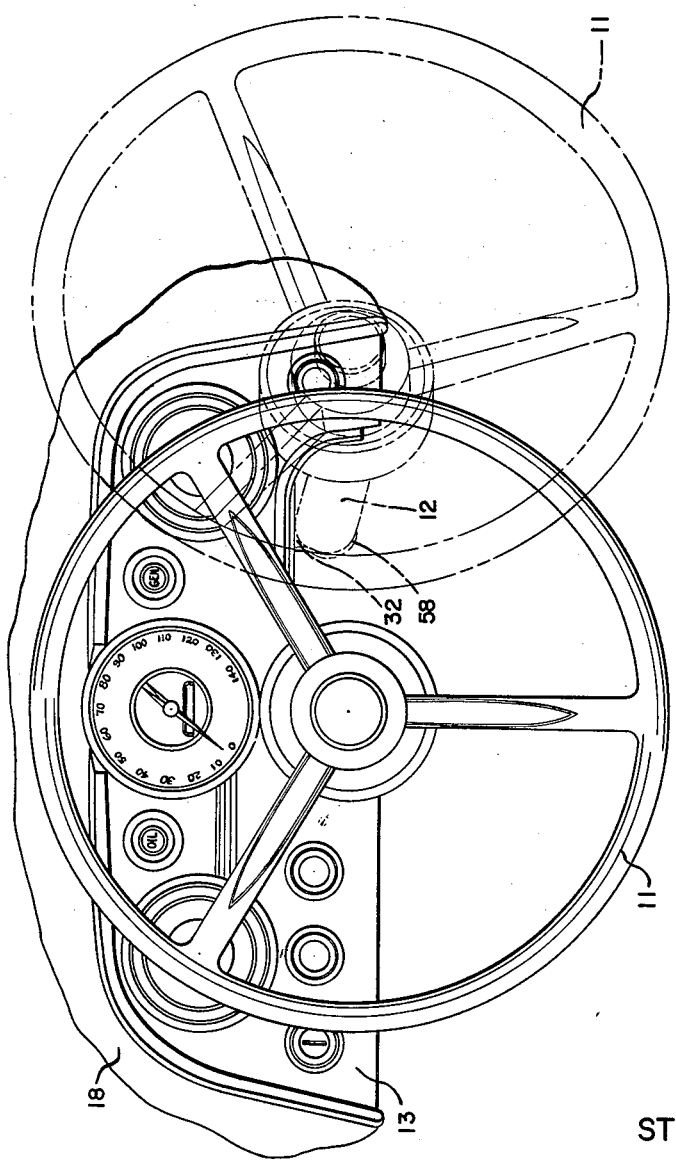
FIG. 1 is a fragmentary view illustrating in solid outline the normal position of the steering wheel and in dot and dash outline the position of the steering wheel when it has been laterally displaced toward the center of the vehicle.

Referring now to the drawings and more particularly to FIGS. 1 and 2, there is illustrated the general orientation of a steering wheel 11 and its supporting column 12 to other parts of a vehicle. In FIG. 1, the steering wheel 11 is shown in solid outline in a normal operative position. The axis of rotation of the steering wheel 11 lies in a vertical plane substantially normal to the plane of the instrument panel 13. In dot and dash outline the steering wheel 11 is shown in a displaced position from its normal operative position. As viewed in FIG. 1, the direction of displacement is to the right or toward the center of the vehicle body. FIG. 2 illustrates the relatively flat angle that the steering column 12 supporting the steering wheel 11 makes with the horizontal plane of the vehicle. FIG. 2 also illustrates the general orientation of the steering column 12 and other parts of the steering gear mechanism with the forward wall 14 of the passenger compartment, that is, the fire wall dividing the passenger compartment from the engine compartment. Also illustrated in solid outline is a portion of the floor board 15, the accelerator pedal 16, the brake pedal 17 which is illustrated as being a hanging member pivotally mounted at its upper end beneath the vehicle cowl 18, and in dot and dash outline a part of the transmission housing 19 and the gear shift mechanism selector lever 21. It will be understood that the foregoing brief discussion is only for the purpose of setting up an exemplary environment in which the present invention is adapted to be used.

Referring now to FIG 2, the steering column 12 is illustrated as being supported for swinging movement about a pivot axis located ahead or on the engine compartment side of the forward wall 14 of the passenger compartment. The pivotal support for the steering column comprises a pivot shaft 22 journalled in suitable bearing devices (not shown) carried in bearing housings or sleeves 23 and 24 on the forward ends of upper and lower support brackets 25 and 26, respectively. The upper support bracket 25 is mounted in any convenient manner on the engine compartment side of the wall 14. The lower bracket 26 is mounted on or actually carries the lower end of the steering column 12. The pivot axis defined by the pivot shaft 22 lies in a vertical longitudinal plane and, as seen in FIG. 2, is also substantially normal to the longitudinal axis of the steering column 12.

The steering shaft 27 is provided with a universal joint 28 immediately below the pivot shaft 22. The lower end of the shaft 27 is operatively coupled to the conventional steering mechanism housed within steering gear housing 29.

The foregoing is only a brief description of the structure located forward of the forward wall 14 of the passenger compartment. Reference may be made to prior art patents, such as U.S. Patents 2,753,848 and 2,865,222, which illustrate equivalent structures for supporting the lower end of a steering column and the steering shaft enclosed thereby for angular or universal adjustment. The present invention is more particularly concerned with the mounting and control of the movement of the upper end of the steering column 12.

Briefly stated, the present invention provides a construction and arrangement in which movement of the steering column 12 from its normal position to an inboard position is controlled and guided by means of a guide track assembly, generally designated 31, supported beneath the instrument panel 13 and a follower 32 attached to the steering column and running in the guide track assembly. The extremities of the column travel are controlled by suitable stops and detents, as will be more fully explained. In the embodiment of the invention illustrated in FIGS. 1 to 6, inclusive, the movement of the steering column is related to the engine by means of an electrical interlock. As will be more fully explained, this system precludes starting of the engine unless the steering column is in the driving position. In addition, the system provides a positive lock mechanism which will prevent movement of the column from the drive position while the engine is running.

Referring now more particularly to FIGS. 3 to 5, inclusive, the guide track assembly 31 comprises a pair of arcuate members 33 and 34 mounted in spaced parallel relationship to each other and lying in planes normal to the pivot axis defined by the pivot shaft 22. Each member 33 and 34 is provided with a depending right angle flange 35 and 36, respectively. The flanges 35 and 36 are positioned in abutting relationship to each other. The guide track assembly 13 is supported on a U-shaped horizontally extending yoke 37 mounted beneath the instrument panel 13 but over the steering column 12, the yoke being secured to the fire wall by suitable flanges, not shown. The yoke is provided with spaced flanges 38 to which the guide track member flanges 35 and 36 are securely fastened by bolts 39.

As was briefly stated above, the upper end of the steering column 12 is slidably supported on the guide track assembly 31 by a follower, generally designated 32. The follower 32 is more in the nature of a hanger bracket. It is provided with a main plate portion 41 having a recess 42 at its lower edge (see FIG. 5) adapted to fit over the steering column 12. The main plate portion is provided with side flanges 43 extending longitudinally of the steering column. At its upper end the main plate portion is provided with a forwardly extending flange 44 adapted to fit between the guide track members 33 and 34. The flange 44 is preferably covered with a low friction material, such as nylon, providing a slide shoe 45. The steering column 12 is retained within the recess 42 by means of a hanger strap 46. The hanger strap 46 is retained to the side flanges 43 of the follower bracket 32 by a suitable bolt, as indicated at 47, extending between the side flanges.

At the inboard end of the guide track assembly 31, the upper end as viewed in FIGS. 4 and 5, a spacer block 48 is positioned between the two track members 33 and 34. The spacer block is retained by a suitable nut and bolt device 49. The spacer block 48, while maintaining the track members 33 and 34 in proper spaced parallel relationship at the inboard end, also performs a second function in that it provides a stop limiting inward movement of the steering column toward the center of the vehicle. The side edge of the flange 44 at the top of the hanger bracket or follower 32 will abut the spacer block thereby limiting further inward movement. The normal operating or outboard position of the steering column is determined by a more elaborate mechanism as will now be described.

The flange 36 of the guide track member 34 is provided at its outboard end, the lower end as viewed in FIGS. 4 and 5, with an offset extension 51. The extension 51 extends upwardly and terminates substantially at the level of the upper surface of the guide track member 33. A locking pawl or detent 52 is pivotally mounted, as by a rivet or pivot stud 53, on the extension 51 so as to extend longitudinally of the guide track assembly 31. The pawl or detent 52 is provided with a detent projection 54. As best seen in FIG. 3, the guide track member 33 and the hanger bracket flange 44 (including the shoe 45 mounted thereon) are provided with apertures 55 and 56 adapted to receive the pawl projection 54. It will be understood that these apertures 55 and 56 are in alignment and adapted to receive the pawl projection 54 only when the steering column is in normal driving position.

Provision is made for locking the pawl projection 54 against retraction from the aligned apertures 55 and 56. As best seen in FIG. 4, the flange 35 of the guide track member 33 is provided with a right angle extension 57 at its outboard end, the lower end as viewed in FIG. 4. The extension 57 extends forwardly and substantially parallel to the longitudinal axis of the steering column 12. An upstanding strap 58 having an overhanging flange 59 is welded or otherwise securely fastened to the inner side of the extension 57. A bracket 61 provided with attachment flanges 62 and 63 is secured to the upper surface of the track member 33 and side wall of the flange 35, respectively. The bracket 61 is provided with a flange 64 extending toward the flange 59 of the strap 58. The gap between the two flanges 59 and 64 is spanned by a suitable bridging member 65, which, as seen in FIG. 4, is substantially U-shaped. Depending from the inner side of the base of the U is a channel member 66 having a short leg portion 67 terminating in spaced relation to the upper surface of the pawl 52. Cradled between the flanges 59 and 64 is a solenoid 68 having a longitudinally extending locking bar 69 projecting from one end thereof.

It will be readily apparent from the relationship of the parts as shown in FIG. 3 that when the locking bar 69 is moved away from the solenoid 68, i.e., toward the direction of the steering wheel, it will overlie the pawl 52 and prevent upward movement of the projection 54 out of the aligned apertures 55 and 56. The channel shaped member 66 overlying the locking bar 69 prevents undue bending stress being exerted on the locking bar if any attempt is made to force the steering wheel toward its inboard position when the locking bar is in pawl or detent blocking position.

A coil spring 71 yieldably urges the locking pawl toward its locking direction, the coil spring extending between a portion of the bridging member 65 and the free end of the locking pawl 52 (see FIG. 5).

Operation of the solenoid 68 controlling the position of the locking bar 69 is controlled by the means of a limit switch 72, which may hereinafter be referred to as the column position switch. As best seen in FIG. 5, the limit switch is mounted on a flange 73 of the yoke 37. When the steering column is in its normal operative position, the actuating element 74 of the limit switch 72 is depressed to close the electrical circuit to energize the column locking solenoid 68 to position the bar over the locking pawl. The electrical circuity involved will be more fully explained with reference to FIG. 6.

It will be understood that the present invention is particularly adapted for use in motor vehicles provided with automatic transmissions. All conventional automatic transmissions are provided with a locking device preventing transmission of power from the engine to the driving wheels whenever the transmission selector lever is placed in "P" (park) position.

Figure 6:
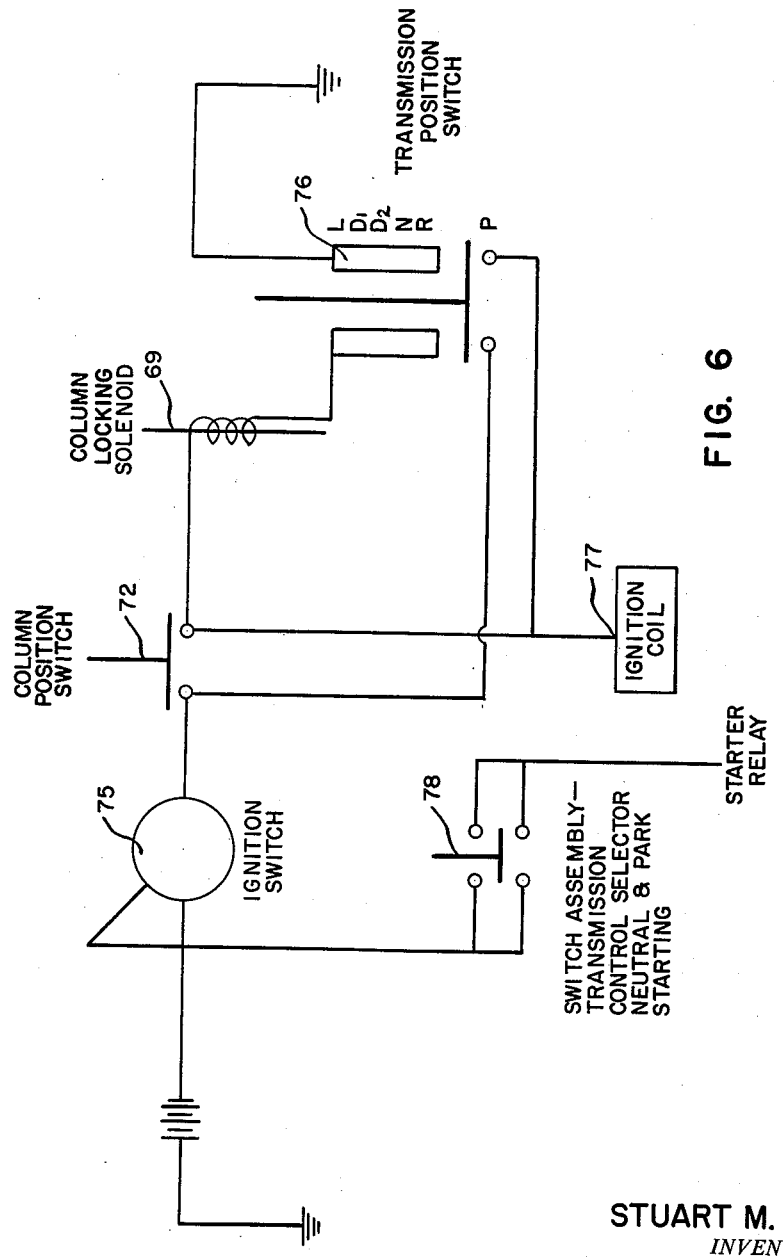
FIG. 6 is a diagrammatic view of a preferred form of electrical circuitry which may be used to provide the necessary safety features relating the control and operation of the vehicle to the position of the steering wheel.

FIG. 6 illustrates a preferred electrical circuit providing an electrical interlock which relates the position and movability of the steering column to the operation of the vehicle. The interlock embodied in the present invention is designed to function in the following manner:

(1) Permits the engine to be started with the transmission selector lever in the "park" position and the column in any position.

(2) Permits the engine to be started with the transmission selector lever in the "neutral" position, but only when the steering column is in the normal "driving" position.

(3) Stops the engine when the transmission selector is taken out of the "park" position with the column in any position other than the normal driving position.

(4) Locks the steering column into the normal driving position when the engine is running and the transmission selector is in any position except "park."

(5) Permits the steering column to be shifted to any position on its designed arc of travel when the ignition switch is off or in the accessory only position.

Assuming the operation cycle begins with the column shifted out of driving position and the transmission selector lever in "park" position, the driver upon entering the car may insert the ignition key and start the engine with the column in or out of driving position. In other words, the driver may leave the steering column out of driving position or immediately after seating himself within the driver's seat pull the steering column toward its normal driving position. If the transmission selector lever is in the "park" position, the engine may be started regardless of the position of the steering column.

Referring to FIG. 6, the circuit for the above operation runs from the closed ignition switch 75 through the transmission position switch 76 to the ignition coil 77 without passing through the column position switch 72. The starter relay switch 78 is closed when the transmission selector lever 21 is in "park" position, indicated by "P" on the circuit diagram, permitting the starter to be energized. If at any time the transmission selector lever 21 is moved out of "park" position before the steering column 12 is placed in the normal driving position, the engine will be stopped by the opening of the transmission position switch 76, which is in the ignition circuit. This condition of the selector lever 21 having to remain in "park" position to start the engine, or once the engine is started to have the engine remain running when the column 12 is not in its normal driving position, is true throughout any sequence of operation.

Having started the engine with the column 12 in or out of driving position and the transmission selector lever 21 in "park" position, the column 12, when swung from an out of driving position into driving position, closes column position switch 72. The column locking solenoid 68 is energized and the column locked into the driving position when the transmission selector lever 21 is moved from the "park" position. As was explained above, this locking action is created by the movement of the locking bar 69 of the solenoid 68 into position between the locking pawl and the channel member 66. Since the movement of this locking bar takes place immediately upon the transmission selector being moved from the "park" position, this assures that the column is locked in position prior to moving the vehicle. Upon stopping the car, the operator may either put the transmission selector lever 21 in "park" position, thus releasing the column 12, or turn off the ignition switch 75 which will also release the column. The column can then be swung out of driving position and greater room for egress of the driver obtained.

One feature of the above-described circuit is that the driver is able to get in and out of the vehicle with the engine running as he would want to do when opening or closing his garage doors. In other words, as long as the transmission selector lever 21 is in the "park" position, the steering column can be shifted to its inboard position without interrupting the ignition circuit. However, should any attempt be made to shift the transmission selector lever to a position other than "park" position, the engine would be stalled. The desirability of this feature as a safety provision will be readily apparent.

Referring now to FIGS. 7 and 8, there is illustrated a second embodiment of the present invention in which the interlock relating steering column position to control of the transmission is accomplished by mechanical means. The mechanical means illustrated can only be utilized with a construction and arrangement in which the transmission selector lever is mounted on the steering column, as in many conventional installations. FIGS. 7 and 8 are semidiagrammatic in form but are believed to clearly illustrate the principle of the invention.

The construction and arrangement of the present embodiment is designed to accomplish the following:

(1) Lock the column in the normal driving position when the transmission selector lever is in any position except "park" to prohibit any accidental shifting of the column while the vehicle is in motion.

(2) Permit shifting of the column only when the transmission selector lever is in "park" position.

(3) Lock the transmission selector lever in "park" position to prevent any forward motion of the vehicle when the column is shifted out of the driving position.

In this embodiment, the steering column is designated 81 and houses a steering shaft 82 and a shift tube 83. Following conventional practice, the shift tube 83 is concentric with the steering shaft and the steering column. A finger element 84 is welded or otherwise securely fastened to the outer surface of the shift tube 83. The finger element 84 has an upstanding arm portion 85 adapted to project through a peripheral slot 86 in the steering column tube 81.

The steering column 81 is diagrammatically illustrated as being supported by a guide track 87, the upper surface of which is slidably engaged by a flanged bracket 88 secured to the steering column. The guide track 87 and the flange 89 of the bracket 88 are provided with elongated slots 91 and 92. The slots 91 and 92 are adapted to overlie each other in alignment in normal operative position of the steering wheel. The upstanding arm 85 of the finger element 84 is provided with a forwardly extending flange 93 terminating in a laterally extending finger 94. As is best seen in FIG. 8, the finger 94 is curved to follow a true radial path about the center of the steering shaft 82.

Four positions of the finger element 84 are illustrated. It may be assumed that the solid outline position indicates that the transmission of the vehicle is in "park" position. The three dot and dash outline positions represent other selector lever positions which may include neutral, drive, reverse or any combination thereof. The important feature is that except in any position other than the "P" (park) position the extreme end 95 of the finger 94 projects through the aligned apertures 91 and 92 preventing the steering column from being shifted out of its normal operative position. The only time that the steering column can be shifted out of its normal operative position is when the finger 94 is rotated to its extreme counterclockwise position, the solid outline position shown in FIG. 8, which corresponds to the "P" (park) position of the transmission selector lever. Should the steering column be moved while the selector lever is in the "P" (park) position, it will be readily apparent that the slots 91 and 92 will be offset relative to one another. The end 95 of the finger 94 will not be able to move through the track 87 preventing movement of the transmission selector lever to a position in which movement of the vehicle could result.

The foregoing may be explained with reference to the operation of the mechanism by the vehicle driver as he leaves the vehicle. In order to shift the steering column inboard he must first put the selector lever in the "P" (park) position. This rotates the finger 94 out of the slot 92 in the track 87. When this is done, the column 81 can be moved inboard, and the resulting movement of the column carries the finger 94 away from the slot 92 in the track. Since no slot 92 exists in the track under the finger in any other location other than the "P" (park) position, when the column is out of the driving position the finger is stopped from rotation by the track, thus precluding the transmission selector lever from being moved from the "P" (park) position.

Upon the vehicle operator entering the vehicle and assumes his normal driving position in the operator's seat, he must first pull the steering column 81 back to its normal driving position to align the slots 91 and 92 and thus the end of the finger 94 with the slot 92 in the track. When this is done, the transmission selector lever can be rotated out of the "P" (park) position, causing the finger 94 to drop through the slot 92 in the track. Since the finger 94 remains in the slot 92 in the track 87 in any transmission selector position except "P" (park), the finger element is effective to hold the column stationary.

It will be understood that the invention is not to be limited to the exact construction shown and described, but that various changes and modifications may be made without departing from the spirit and scope of the invention, as defined in the appended claims.

I claim:

1. In a motor vehicle having an engine, transmission means, drive wheels, and selector means controlling the transmission of power from said engine through said transmission means to said drive wheels, said selector means having at least one position indicating that said transmission means is in a non-power transmitting condition, a support structure, a steering column, means supporting said steering column on said support structure for swinging movement from a normal operative position to a displaced position, and means correlating the position of said selector means and said steering column to prevent said transmission from transmitting power from said engine to said drive wheels when said steering column is in a displaced position.

2. In a motor vehicle having an engine, transmission means, drive wheels, and selector means controlling the transmission of power from said engine through said transmission means to said drive wheels, said selector means having at least one position providing nonpower transmitting operation of said transmission means, a support structure, a steering column, means supporting said steering column on said support structure for swinging movement from a normal operative position to a displaced position, latch means coupled to said selector means and constructed and arranged to hold said steering column when in its normal operating position against movement to said displaced position in all positions of said selector means other than said nonpower transmitting indicating position.

3. In a motor vehicle having an engine, transmission means, drive wheels, and selector means controlling said transmission means, said selector means including an operating member having at least one position indicating said transmission means is in a nonpower transmitting condition, a support structure, a steering column, means supporting said steering column for swinging movement from a normal operative position to a displaced position, said support means comprising guide means carried by said support structure and follower means carried by said column slidably engaged with said guide means, latch means coupled to said selector member constructed and arranged to hold said steering column immovable relative to said guide means in said normal operative position, said latch means being inoperative only when said selector member is in said one position.

4. In a motor vehicle having an engine, transmission means, drive wheels, and selector means controlling said transmission means, said selector means including an operating member having at least one position indicating said transmission means is in a nonpower transmitting condition, a support structure, a steering column, means supporting said steering column for swinging movement from a normal operative position to a displaced position, said support means comprising guide means carried by said support structure and follower means carried by said column slidably engaged with said guide means, latch means having a part thereof positionable to hold said follower means immovable relative to said guide means, said follower means and guide means having portions thereof positionable in alignment to receive said latch means part only when said steering column is in its normal operative position, said latch means part blocking movement of said selector lever from said one position when said steering column is displaced from its normal operating position.

5. In a motor vehicle having an engine, transmission means, drive wheels, and selector means controlling said transmission means, said selector means including an operating member having at least one position indicating said transmission means is in a nonpower transmitting condition, a support structure, a steering column, said selector member being mounted on said steering column, means supporting said steering column for swinging movement from a normal operative position to a displaced position, said support means comprising guide means carried by said support structure and follower means carried by said column slidably engaged with said guide means, latch means having a part thereof positionable to hold said follower means immovable relative to said guide means, and thereby said steering column immovable relative to said support structure, said follower means and guide means having portions thereof positionable in alignment to receive said latch means part only when said steering column is in its normal operative position, said latch means part blocking movement of said selector lever from said one position when said steering column is displaced from its normal operative position.

6. In a motor vehicle having an engine, transmission means, drive wheels, and selector means controlling said transmission means, said selector means including an operating member having at least one position indicating said transmission means is in a nonpower transmitting condition, a support structure, a steering column, means supporting said steering column for swinging movement from a normal operative position to a displaced position, said support means comprising guide means carried by said column slidably engaged with said guide means, latch means carried on said guide means positionable to hold said follower means immovable relative to said guide means, solenoid operated means operable to block unlatching movement of said latch means, and an electrical interlock circuit operative except in said one selector means position to energize said solenoid means.

7. In a motor vehicle having an engine, transmission means, drive wheels, and selector means controlling said transmission means, said selector means including an operating member having at least one position indicating said transmission means is in a nonpower transmitting condition, a support structure, a steering column, means supporting said steering column for swinging movement from a normal operative position to a displaced position, said support means comprising guide means carried by said support structure and follower means carried by said column slidably engaged with said guide means, latch means carried on said guide means positionable to hold said follower means immovable relative to said guide means, solenoid operated means operable to block unlatching movement of said latch means, and an electrical interlock circuit operative except in said one selector means position to energize said solenoid means, said electrical interlock circuit including a limit switch positioned to signal placement of said steering column in its normal operative position.

8. In a motor vehicle having an engine, transmission means, drive wheels, and selector means controlling said transmission means, said selector means including an operating member having a least one position indicating said transmssion means is in a nonpower transmitting condition, a support structure, a steering column, means supporting said steering column for swinging movement from a normal operative position to a displaced position, said support means comprising guide means carried by said support structure and follower means carried by said column slidably engaged with said guide means, latch means carried on said guide means positionable to hold said follower means immovable relative to said guide means, said follower means and guide means having portions thereof positionable in alignment to receive a part of said latch device only when said steering column is in its normal operative position, solenoid operated means provided with a blocking member positionable to block withdrawal of said latch part from said aligned portions, and an electrical interlock circuit operative except in said one position of said selector means to energize said solenoid means to position said blocking member in blocking position.

9. In a motor vehicle having an engine, transmission means, drive wheels, and selector means controlling said transmission means, said selector means including an operating member having at least one position indicating said transmission means is in a nonpower transmitting condition, a support structure, a steering column, means supporting said steering column for swinging movement from a normal operative position to a displaced position, said support means comprising guide means carried by said support structure and follower means carried by said column slidably engaged with said guide means, latch means carried on said guide means positionable to hold said follower means immovable relative to said guide means, said follower means and guide means having portions thereof positionable in alignment to receive a part of said latch device only when said steering column is in its normal operative position, solenoid operated means provided with a blocking member positionable to block withdrawal of said latch part from said aligned portions, and an electrical interlock circuit operative except in said one position of said selector means to energize said solenoid means to position said blocking member in blocking position, said electrical interlock circuit including a limit switch carried by said guide means adapted to be abutted by said follower means to signal placement of said steering column in its normal operative position.

10. In a motor vehicle having propulsion means, transmission means, driving wheels, a steering column and control means for operating said vehicle, a support structure, means supporting said steering column on said support structure for swinging movement about an inclined axis from a normal operative position to a displaced position, latch means operative to releasably retain said steering column in its normal operative position, and means actuating said latch means in response to operation of said control means.

11. In a motor vehicle having an engine, transmission means, drive wheels, and selector means controlling the transmission of power from said engine through said transmission means to said drive wheels, said selector means having at least one position indicating that said transmission means is in a nonpower transmitting condition, a support structure, a steering column, means supporting said steering column on said support structure for movement from a normal operative position to a displaced position, and means correlating the position of said selector means and said steering column to prevent said transmission from transmitting power from said engine to said drive wheels when said steering column is in a displaced position.

12. In a motor vehicle having an engine, transmission means, drive wheels, and selector means controlling the transmission of power from said engine through said transmission means to said drive wheels, said selector means having at least one position providing nonpower transmitting operation of said transmission means, a support structure, a steering column, means supporting said steering column on said support structure for movement from a normal operative position to a displaced position, latch means coupled to said selector means and constructed and arranged to hold said steering column in its normal operating position against movement to said displaced position in all positions of said selector means other than said nonpower transmitting indicating position.

13. In a motor vehicle having propulsion means, transmission means, driving wheels, a steering column and control means for operating said vehicle, a support structure, means supporting said steering column on said support structure for movement from a normal operative position to a displaced position, latch means operative to releasably retain said steering column in its normal operative position, and means actuating said latch means in response to operation of said control means.

14. In a motor vehicle having propulsion means, transmission means, driving wheels, a steering column and control means for operating said vehicle, a support structure, means supporting said steering column on said support structure for movement from a normal operative position to a displaced position, latch means operative to releasably retain said steering column in one of said positions, and means for moving said latch means between its latched and unlatched position in response to operation of said control means.

References Cited in the file of this patent

UNITED STATES PATENTS

| 627,201 | Paget | June 20, 1899 |
|---|---|---|
| 805,944 | Clark | Nov. 28, 1905 |
| 917,684 | Van Nort | Apr. 6, 1909 |
| 1,288,906 | Jensen | Dec. 24, 1918 |
| 1,427,212 | Keller | Aug. 29, 1922 |
| 2,248,747 | Dick | July 8, 1941 |
| 2,436,153 | Sanmori | Feb. 17, 1948 |
| 2,841,411 | Sheppard et al. | July 1, 1958 |

FOREIGN PATENTS

| 737,959 | Great Britain | Oct. 5, 1955 |